(12) United States Patent
Kokubu et al.

(10) Patent No.: US 11,828,244 B2
(45) Date of Patent: Nov. 28, 2023

(54) FUEL INJECTION CONTROL METHOD AND DEVICE FOR INTERNAL COMBUSTION ENGINE

(71) Applicant: NISSAN MOTOR CO., LTD., Yokohama (JP)

(72) Inventors: Toshiyuki Kokubu, Kanagawa (JP); Kazuyuki Hara, Kanagawa (JP); Takao Kawasaki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/921,892

(22) PCT Filed: Apr. 28, 2020

(86) PCT No.: PCT/JP2020/018117
§ 371 (c)(1),
(2) Date: Oct. 27, 2022

(87) PCT Pub. No.: WO2021/220400
PCT Pub. Date: Nov. 4, 2021

(65) Prior Publication Data
US 2023/0167781 A1    Jun. 1, 2023

(51) Int. Cl.
*F02D 41/30*    (2006.01)
(52) U.S. Cl.
CPC .. *F02D 41/3076* (2013.01); *F02D 2200/0604* (2013.01)
(58) Field of Classification Search
CPC ......... F02D 41/3076; F02D 2200/0604; F02D 41/406; F02D 2041/1432; F02D 41/40; F02D 41/3836; Y02T 10/40
See application file for complete search history.

(56) References Cited

U.S. PATENT DOCUMENTS 4,565,065 A * 1/1986 Kimura ................ F02M 61/161
60/285
2004/0107944 A1   6/2004 Yomogida et al.
(Continued)

FOREIGN PATENT DOCUMENTS

JP      2010-101296 A    5/2010
JP          5045640 B2   10/2012
(Continued)

*Primary Examiner* — Joseph J Dallo
(74) *Attorney, Agent, or Firm* — Foley & Lardner LLP (57) ABSTRACT

A fuel injection control method for an internal combustion engine is provided. The internal combustion engine includes a fuel pump (38) that pressure-feeds fuel, a fuel injection valve (19) that injects the fuel pressure-fed by the fuel pump directly into a cylinder of the internal combustion engine (1), and a fuel pressure detection device (45) that detects a pressure of the fuel pressure-fed by the fuel pump. The fuel injection control method executes a first smoothing process (S3) of performing a smoothing process on a detected fuel pressure by first smoothing, a second smoothing process (S4) of performing a smoothing process on the detected fuel pressure by second smoothing different from the first smoothing, and a selection process (S5) of selecting, based on an operating state of the internal combustion engine, whether to execute fuel injection control (S6, S7) based on a first detected fuel pressure smoothed by the first smoothing process or fuel injection control (S8, S9) based on a second detected fuel pressure smoothed by the second smoothing process.

7 Claims, 6 Drawing Sheets

(56) References Cited

U.S. PATENT DOCUMENTS

2017/0268454 A1\* 9/2017 Fujii .................. F02D 41/3082
2018/0171927 A1   6/2018 Suda et al.

FOREIGN PATENT DOCUMENTS

WO    WO-2008130257 A1 \* 10/2008    ........... B60R 25/042
WO    WO-2019202883 A1 \* 10/2019    ........... F02D 41/107

\* cited by examiner

FUEL INJECTION CONTROL METHOD AND DEVICE FOR INTERNAL COMBUSTION ENGINE

TECHNICAL FIELD

The present invention relates to fuel injection control method and device for an internal combustion engine, in particular, for an in-cylinder injection-type internal combustion engine.

BACKGROUND ART

In-cylinder injection-type internal combustion engines have a higher injection pressure of fuel (also referred to as a fuel pressure, hereinafter) than that of intake port injection-type internal combustion engines, so variations in the fuel pressure have a large effect on variations in the fuel injection amount, and the accuracy in air-fuel ratio control may deteriorate. In this context, a fuel injection control device has been proposed (Patent Document 1), in which a determination is made whether the fuel pressure is in a transient state or a steady state based on the degree of variation in the fuel pressure, and the degree of smoothing of the detected fuel pressure is changed in accordance with the determination result, or when the internal combustion engine is started, the injection pulse width is corrected based on the detected fuel pressure which is not subjected to the smoothing process, and after the internal combustion engine is started, the injection pulse width is corrected based on the detected fuel pressure which is subjected to the smoothing process.

PRIOR ART DOCUMENT

[Patent Document]
  [Patent Document 1] JP5045640B

SUMMARY OF INVENTION

[Problems to be Solved by Invention]

However, in the method of changing the degree of smoothing in one kind of smoothing process based on the degree of variation in the fuel pressure or the method of changing the presence or absence of the smoothing process between when the engine is started and after the engine is started as in the above-described prior art, there is still room for improvement regarding the accuracy in the air-fuel ratio control.

A problem to be solved by the present invention is to provide fuel injection control method and device for an internal combustion engine that have a high degree of accuracy in the air-fuel ratio control during the fuel injection.

[Means for Solving Problems]

The present invention solves the above problem through executing a first smoothing process and a second smoothing process that performs smoothing different from that in the first smoothing process on a detected fuel pressure and selecting, based on the operating state of an internal combustion engine, whether to execute fuel injection control based on a first detected fuel pressure smoothed by the first smoothing process or fuel injection control based on a second detected fuel pressure smoothed by the second smoothing process.

[Effect of Invention]

According to the present invention, different types of smoothing are performed on the detected fuel pressure based on the operating state of an internal combustion engine, and it is therefore possible to further improve the accuracy in the air-fuel ratio control of the internal combustion engine.

MODE(S) FOR CARRYING OUT THE INVENTION

Figure 1:
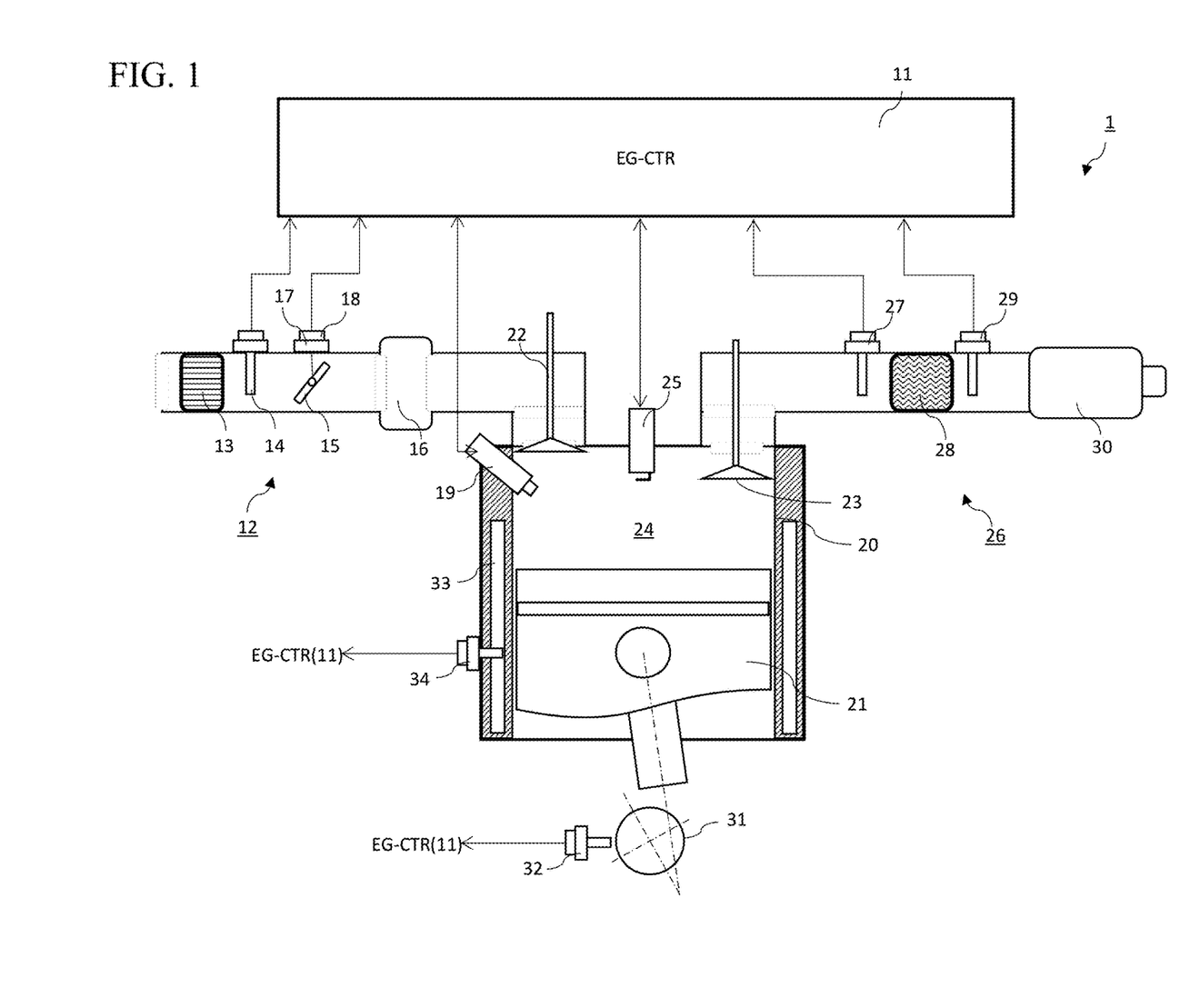
FIG. 1 is a block diagram illustrating an internal combustion engine to which an embodiment of the fuel injection control method and device according to the present invention is applied.

Hereinafter, one or more embodiments of the present invention will be described with reference to the drawings. FIG. 1 is a block diagram illustrating an internal combustion engine to which an embodiment of the fuel injection control method and device according to the present invention is applied. In particular, this internal combustion engine represents an example of a spark ignition-type and in-cylinder direct injection-type internal combustion engine 1. The internal combustion engine 1 of the present embodiment has an air-intake passage 12. The air-intake passage 12 is provided with an air filter 13, an air flow meter 14 that detects the intake air flow rate, and a throttle valve 15 and a collector 16 that control the intake air flow rate.

The throttle valve 15 is provided with a throttle valve actuator 17 such as a DC motor that adjusts the opening degree of the throttle valve 15. The throttle valve actuator 17 electronically controls the opening degree of the throttle valve 15 based on a drive signal from an engine control unit 11 so as to achieve the required torque in response to an amount of the accelerator pedal operation or the like performed by the driver. The throttle valve 15 is provided with a throttle sensor 18 that detects the opening degree of the throttle valve 15, and the throttle sensor 18 outputs its detection signal to the engine control unit 11.

A combustion chamber 24 is defined as a space surrounded by a cylinder 20, the crown surface of a piston 21 that reciprocates in the cylinder, and a cylinder head that is provided with an intake valve 22 and an exhaust valve 23. An ignition plug 25 is mounted facing inside the combustion chamber 24 of each cylinder and ignites the intake air-fuel mixture based on an ignition signal from the engine control unit 11.

An exhaust passage 26 is provided with an air-fuel ratio sensor 27 that detects the air-fuel ratio of the exhaust and thus the intake air-fuel mixture by detecting the concentration of a specific component in the exhaust, for example, the concentration of oxygen, and the detection signal of the air-fuel ratio sensor 27 is output to the engine control unit 11. The air-fuel ratio sensor 27 may be an oxygen sensor that outputs a rich/lean output or may also be a wide-range air-fuel ratio sensor that linearly detects the air-fuel ratio over a wide range.

The exhaust passage 26 is also provided with an exhaust purification catalyst 28 for purifying the exhaust. Examples of the exhaust purification catalyst 28 for use include a three-way catalyst and an oxidation catalyst. The three-way catalyst can purify the exhaust through oxidizing the carbon monoxide CO and hydrocarbons HC in the exhaust and performing reduction of the nitrogen oxides NOx in the exhaust in the vicinity of the stoichiometry (theoretical air-fuel ratio, $\lambda=1$, air weight/fuel weight=14.7). The oxidation catalyst performs oxidation of the carbon monoxide CO and hydrocarbons HC in the exhaust.

The exhaust passage 26 is provided with an oxygen sensor 29 downstream the exhaust purification catalyst 28. The oxygen sensor 29 detects the concentration of a specific component in the exhaust, for example, the concentration of oxygen and outputs a rich/lean output, and its detection signal is output to the engine control unit 11. In this configuration, the oxygen sensor 29 is provided downstream the exhaust purification catalyst 28 for the purpose of suppression or the like of control errors due to deterioration of the air-fuel ratio sensor 27, etc. through correcting the air-fuel ratio feedback control based on the detection value of the air-fuel ratio sensor 27 by using the detection value of the oxygen sensor 29 (for the purpose of adopting a so-called double air-fuel ratio sensors system), but if it suffices that the air-fuel ratio feedback control is performed based only on the detection value of the air-fuel ratio sensor 27, the oxygen sensor 29 may be omitted. In FIG. 1, reference numeral 30 represents a muffler.

The internal combustion engine 1 has a crankshaft 31 that is provided with a crankshaft angle sensor 32, and the engine control unit 11 can detect an engine rotation speed Ne by counting, for a certain period of time, a crankshaft unit angle signal that is output from the crankshaft angle sensor 32 in synchronization with the engine rotation, or by measuring the cycle of a crank reference angle signal.

The internal combustion engine 1 has a cooling jacket 33 therein. The cooling jacket 33 is provided with a water temperature sensor 34 facing inside the cooling jacket 33. The water temperature sensor 34 detects a cooling water temperature Tw in the cooling jacket 33 and outputs it to the engine control unit 11.

Fuel injection valves 19 are each provided facing inside the combustion chamber 24. Each fuel injection valve 19 is driven to open by a fuel injection pulse signal (signal having a fuel injection pulse width Ti to be described later) that is set in the engine control unit 11. The fuel injection valve 19 directly injects the fuel, which is pressure-fed from the fuel pump and controlled to have a predetermined pressure by a pressure regulator, into the cylinder at a predetermined timing so that the injection amount is obtained in accordance with the driving demand. An example of a fuel injection system that supplies the fuel to the fuel injection valves 19 is illustrated in FIG. 2.

Figure 2:
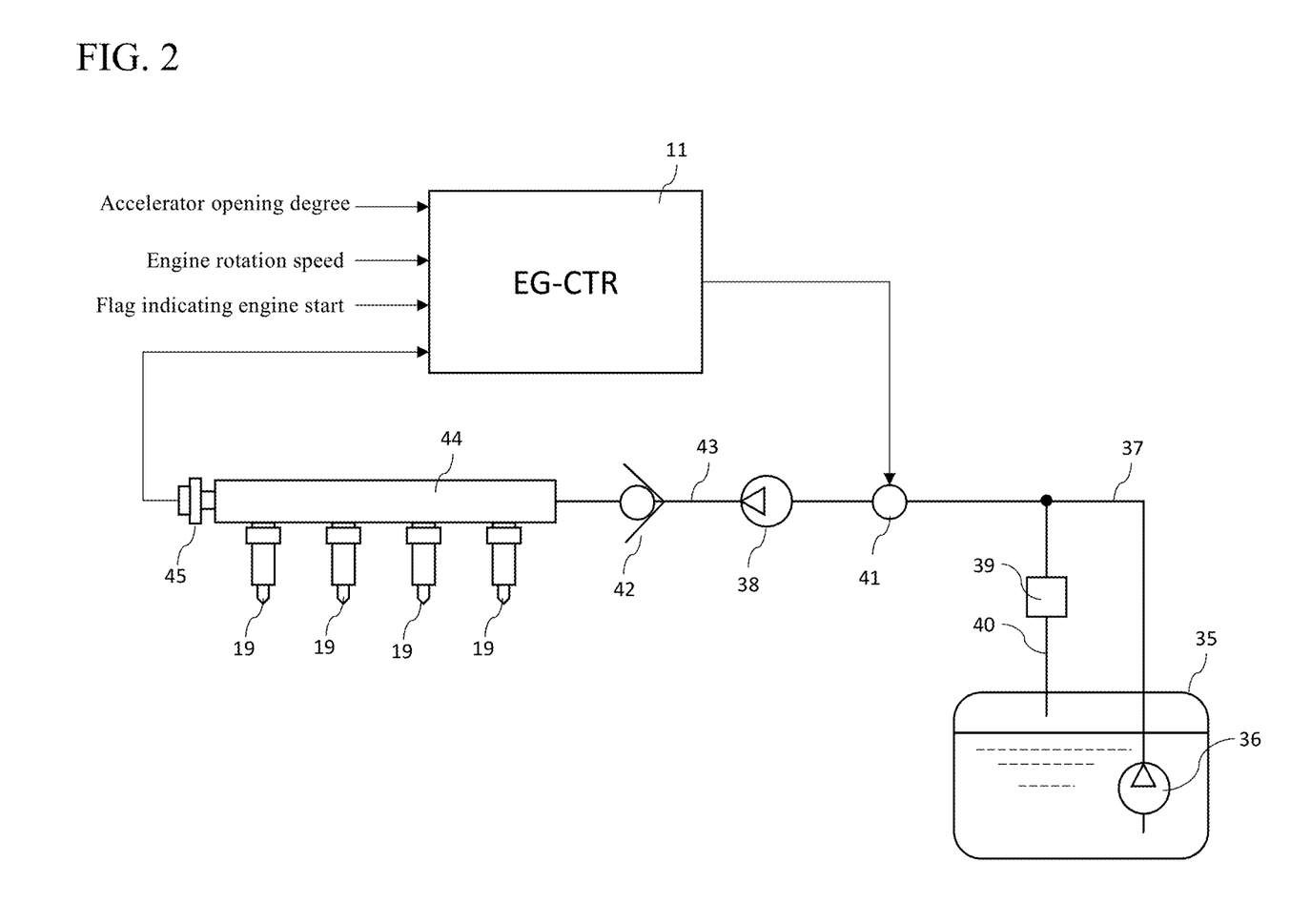
FIG. 2 is a block diagram illustrating an example of a fuel injection system that supplies fuel to fuel injection valves of FIG. 1.

FIG. 2 is a block diagram illustrating an example of a fuel injection system that supplies fuel to the fuel injection valves 19. This system includes a fuel tank 35 that stores fuel. The fuel tank 35 is provided with a low-pressure pump 36 that pumps up the fuel. The low-pressure pump 36 is driven by an electric motor (not illustrated) whose power source is a battery. The fuel sucked by the low-pressure pump 36 is supplied to a high-pressure pump 38 through a low-pressure fuel pipe 37. The low-pressure fuel pipe 37 is provided with a pressure regulator 39. The pressure regulator 39 regulates the discharge pressure of the low-pressure pump 36, that is, the fuel supply pressure to the high-pressure pump 38, to a predetermined pressure. An excessive amount of fuel above that pressure is returned to the fuel tank 35 through a fuel return pipe 40.

The high-pressure fuel discharged from the high-pressure pump 38 flows into a fuel rail 44 (also referred to as a delivery pipe) through a high-pressure fuel pipe 43 and is supplied to the fuel injection valves 19 attached to respective cylinders of the internal combustion engine 1. The fuel rail 44, which is a part of the high-pressure fuel pipe 43, is provided with a fuel pressure sensor 45 (fuel pressure detection device) that detects the pressure of fuel supplied from the high-pressure pump 38 to the fuel injection valves 19. The detection signal of the fuel pressure sensor 45 is output to the engine control unit 11.

Figure 3:
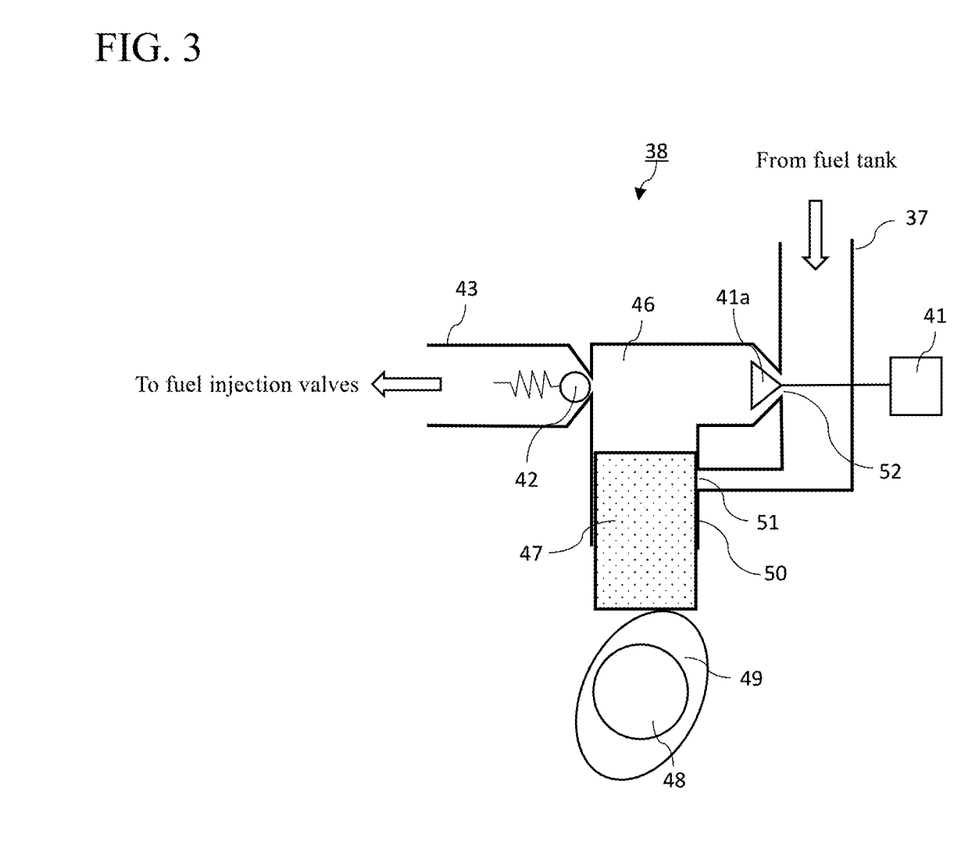
FIG. 3 is a schematic diagram illustrating a configuration example of a high-pressure pump of FIG. 2.

FIG. 3 is a schematic diagram illustrating a configuration example of the high-pressure pump 38 including a fuel pressure control valve 41 and a check valve 42 of FIG. 2. The high-pressure pump 38 of the present embodiment is a plunger pump that reciprocates a plunger 47 in a fuel chamber 46 to suck/discharge the fuel. The plunger 47 is biased toward a pump cam 49 fixed to a camshaft 48 of the internal combustion engine 1 and reciprocates in a plunger cylinder 50 as the pump cam 49 rotates. In FIG. 3, the low-pressure fuel pipe 37 of FIG. 2 is connected to the upper right, and the high-pressure fuel pipe 43 of FIG. 2 is connected to the left.

The fuel pressure control valve 41, which is composed of a normally open-type solenoid valve, is provided on the low-pressure fuel pipe 37 side of the high-pressure pump 38 of the present embodiment. The plunger cylinder 50 communicates with the fuel chamber 46, and the volume of the fuel chamber 46 expands or contracts in accordance with the position of the plunger 47 reciprocating in the plunger cylinder 50. The low-pressure fuel pipe 37 and the plunger cylinder 50 are connected via a first opening portion 51. The first opening portion 51 opens at the middle of the plunger cylinder 50 so as to communicate with the fuel chamber 46 only when the plunger 47 moves down to expand the fuel chamber 46. The low-pressure fuel pipe 37 and the fuel chamber 46 are normally communicated with each other via a second opening portion 52. The second opening portion 52 is opened and closed by a valve body 41a of the fuel pressure control valve 41. That is, the fuel pressure control valve 41 controls the opening/closing timing of the valve body 41a thereby to adjust the amount of fuel discharged from the fuel chamber 46 to the high-pressure fuel pipe 43. The high-pressure fuel pipe 43 is normally communicated with the fuel chamber 46 via the check valve 42, which allows the fuel to be discharged from the fuel chamber 46 but prevents the backward flow of the fuel.

In a stroke in which the plunger 47 moves down as the pump cam 49 rotates, and the volume of the fuel chamber 46 expands, the valve body 41a closes the second opening portion 52. This operation shuts off the communication between the low-pressure fuel pipe 37 and the fuel chamber 46, and the check valve 42 prevents the backflow of fuel from the high-pressure fuel pipe 43; therefore, the pressure in the fuel chamber 46 becomes negative. When the plunger 47 further moves down and the first opening portion 51 opens, the fuel from the low-pressure fuel pipe 37 flows into the plunger cylinder 50 and is sucked into the fuel chamber 46. Then, when the plunger 47 changes from the downward stroke to the upward stroke, the fuel pressure in the fuel chamber 46 increases as the volumes of the plunger cylinder 50 and fuel chamber 46 decrease after the first opening portion 51 of the plunger cylinder 50 is closed. The fuel thus pressurized in the fuel chamber 46 pushes open the check valve 42 and flows out to the high-pressure fuel pipe 43.

During this operation, by controlling the opening degree of the valve body 41a of the fuel pressure control valve 41 in accordance with a command signal from the engine control unit 11, the pressure and amount of the fuel discharged from the fuel chamber 46 to the high-pressure fuel pipe 43 are adjusted. For example, as the opening time of the valve body 41a is lengthened when the plunger 47 is in the upward stroke, the fuel pressure can be decreased to reduce the discharge amount of the fuel, while as the opening time of the valve body 41a is shortened when the plunger 47 is in the upward stroke, the fuel pressure can be increased to increase the discharge amount of the fuel.

The high-pressure pump 38 of the present embodiment is feedback-controlled based on a basic fuel pressure that is preliminarily set in accordance with the engine rotation speed and an actual fuel pressure that is detected by the fuel pressure sensor 45. This will be more specifically described. The engine control unit 11 stores a control map of a basic fuel pressure that is preliminarily set for the high-pressure pump 38 in accordance with the engine rotation speed, for example, a control map that is set such that the horizontal axis represents the pulse width for a basic fuel pressure to be output to the fuel pressure control valve 41, which is composed of an electromagnetic valve, and the vertical axis represents the engine rotation speed. When the operation is started, the pulse width for the basic fuel pressure corresponding to the engine rotation speed is extracted from the control map and corrected with the actual fuel pressure detected by the fuel pressure sensor 45, and the corrected pulse width is adopted as the next pulse width for the fuel pressure. The actual fuel pressure used in this operation will be described later.

The fuel injection valves 19 are driven to open by a fuel injection pulse signal that is set in the engine control unit 11. The engine control unit 11 calculates a basic fuel injection pulse width Tp corresponding to a basic fuel injection amount in accordance with the operating conditions of the internal combustion engine 1, such as the driver's accelerator operation and the vehicle speed, and also calculates a fuel pressure correction coefficient K1 and another fuel correction coefficient K2. The fuel pressure correction coefficient K1 is calculated in accordance with the fuel pressure detected by the fuel pressure sensor 45. Then, the basic fuel injection pulse width Tp is multiplied by the fuel pressure correction coefficient K1 and the other fuel correction coefficient K2 to obtain a product, and an invalid injection pulse width Ts is added to the product to obtain a fuel injection pulse width for control Ti corresponding to the final fuel injection amount (Ti=Tp×K1×K2+Ts). A signal of the fuel injection pulse width for control Ti thus obtained is output to the fuel injection valves 19, and a target injection amount of fuel is thereby injected into each cylinder.

Now, in the internal combustion engine 1 of the present embodiment, to suppress variations in the fuel injection amount caused by variations in the fuel pressure, the fuel injection pulse width is corrected in accordance with the fuel pressure detected by the fuel pressure sensor 45, and further to prevent the fuel injection pulse width from being erroneously corrected due to the influence of high-frequency variations in the fuel pressure, the fuel pressure detected by the fuel pressure sensor 45 is subjected to a smoothing process such as a moderating process (weighted averaging process) to correct the fuel injection pulse width in accordance with the detected fuel pressure after the smoothing process.

Figure 4:
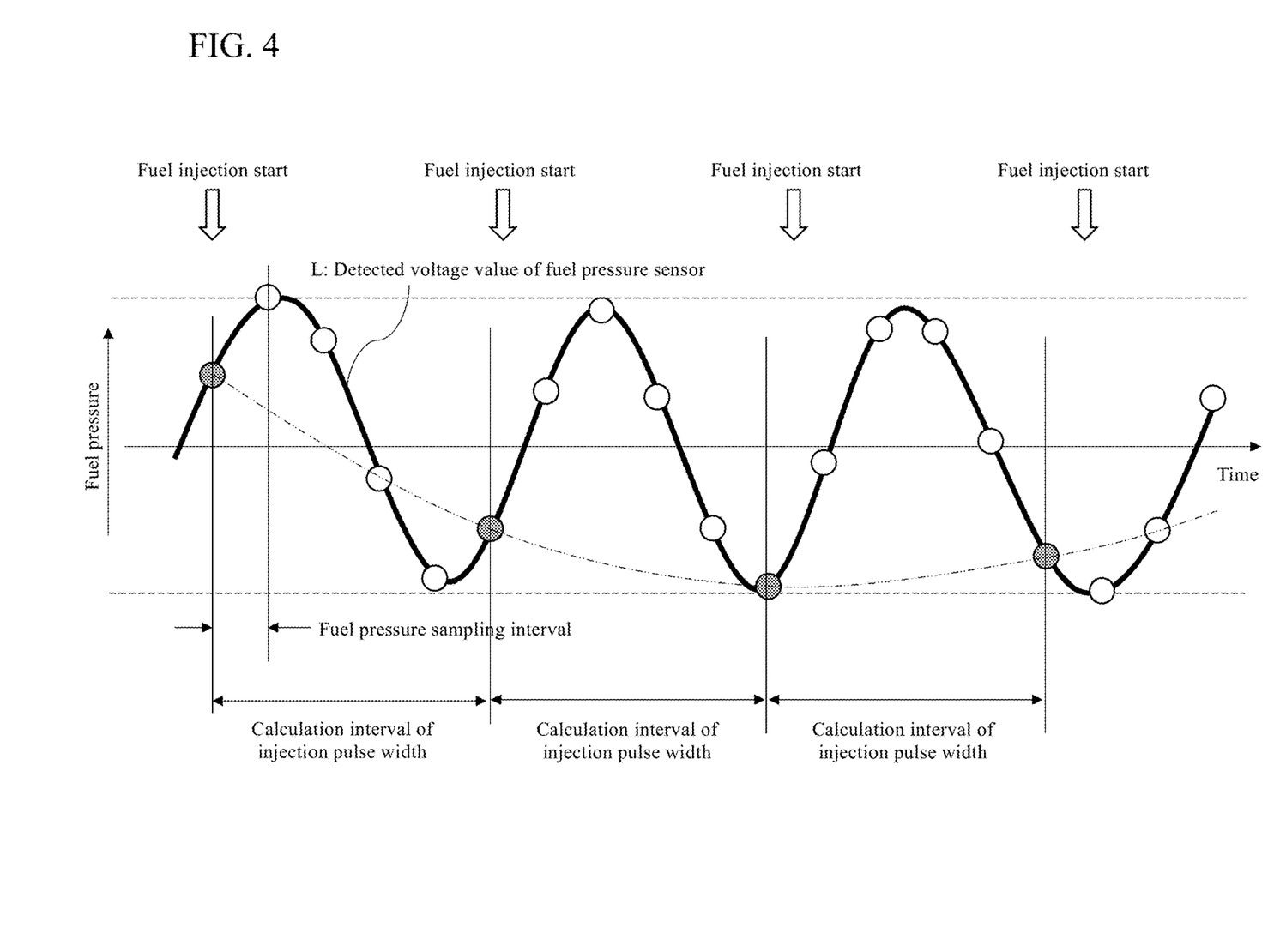
FIG. 4 is a diagram for describing a first smoothing process executed on a detected voltage value of a fuel pressure sensor in the internal combustion engine of FIG. 1.

Here, the pressure of the fuel discharged from the high-pressure pump 38 toward the fuel injection valves 19 is detected by the fuel pressure sensor 45 provided in the fuel rail 44. FIG. 4 is a diagram illustrating an example of the relationships between the fuel pressure detected by the fuel pressure sensor 45, the sampling interval, the calculation interval for the fuel injection pulse, and the timing of fuel injection. In this figure, a thick solid line L indicates a detected voltage value of the fuel pressure sensor 45 at a certain engine speed. The pressure of the fuel discharged from the high-pressure pump 38 toward the fuel injection valves 19 is affected by the pressure feeding from the high-pressure pump 38 and/or the fuel injection from the fuel injection valves 19 and therefore generates an analog signal having a periodic waveform as illustrated in FIG. 4.

The engine control unit 11 samples the voltage value thus output from the fuel pressure sensor 45 at time intervals, for example, of 2 msec as illustrated in the figure, subjects the voltage values sampled at this cycle to a weighted averaging process at time intervals, for example, of 10 msec, and uses the obtained results for calculation of the fuel injection pulse width. The white circles on the waveform L of the detected voltage value of the fuel pressure sensor 45 in FIG. 4 indicate the detected voltage values sampled at 2 msec intervals, and likewise the black circles indicate the voltage values obtained by subjecting the detected voltage values to the weighted averaging process at 10 msec intervals. The black-circled voltage values subjected to the weighted averaging process are used for calculation of the subsequent fuel injection ("fuel injection start" timing in the figure). Here, the black-circled voltage values subjected to the weighted averaging process periodically vary as indicated by the chain double-dashed line in the figure. Therefore, even when the fuel injection pulse width is calculated using the detected voltage values subjected to the weighted averaging process, the fuel injection amount still includes the variation in the actual fuel pressure.

Accordingly, for the fuel pressure detected by the fuel pressure sensor 45, the engine control unit 11 of the present embodiment executes a first smoothing process of performing a smoothing process by first smoothing and a second smoothing process of performing a smoothing process by second smoothing different from the first smoothing. Then, the engine control unit 11 performs a selection process of selecting, based on the operating state of the internal combustion engine 1, whether to execute fuel injection control based on a first detected fuel pressure smoothed by the first smoothing process or fuel injection control based on a second detected fuel pressure smoothed by the second smoothing process.

The fuel injection control executed by the engine control unit 11 includes a correction calculation process of correcting, based on the detected fuel pressures subjected to the smoothing processes of the first smoothing process and the second smoothing process, the above-described basic fuel injection pulse width Tp to calculate a fuel injection pulse width for control Ti. The correction calculation process is performed for the fuel injection amount from the fuel injection valves 19. In addition to this, the fuel injection control executed by the engine control unit 11 may include fuel pump feedback control of feedback-controlling the fuel pressure control valve 41 of the high-pressure pump 38 based on the detected fuel pressures subjected to the smoothing processes of the first smoothing process and the second smoothing process.

In the internal combustion engine 1 of the present embodiment, a moderating process of weighted-averaging the fuel pressure detected by the fuel pressure sensor 45 is used as the first smoothing. FIG. 4 is a diagram for describing the first smoothing process executed on the detected voltage value of the fuel pressure sensor 45 in the internal combustion engine 1 of the present embodiment. As illustrated in FIG. 4, the moderating process as the first smoothing includes sampling the analog detection voltage (indicated by waveform L), which is continuously output from the fuel pressure sensor 45, at time intervals, for example, of 2 msec (intervals of sampling the fuel pressure) and weighted-averaging the fuel pressure value weighted and averaged last time and the fuel pressure value detected this time. That is, the weighted average value is updated at intervals of 2 msec. For example, when Pav represents a moderated value of the detected fuel pressure (i indicates this time and i−1 indicates last time), P represents the detected fuel pressure, and a represents a moderating coefficient (0<α<1), the fuel pressure value detected this time is calculated based on a function of Pav(i)=Pav(i−1)×α+P×(1−α). This represents the first detected fuel pressure smoothed by the first smoothing process.

Figure 5:
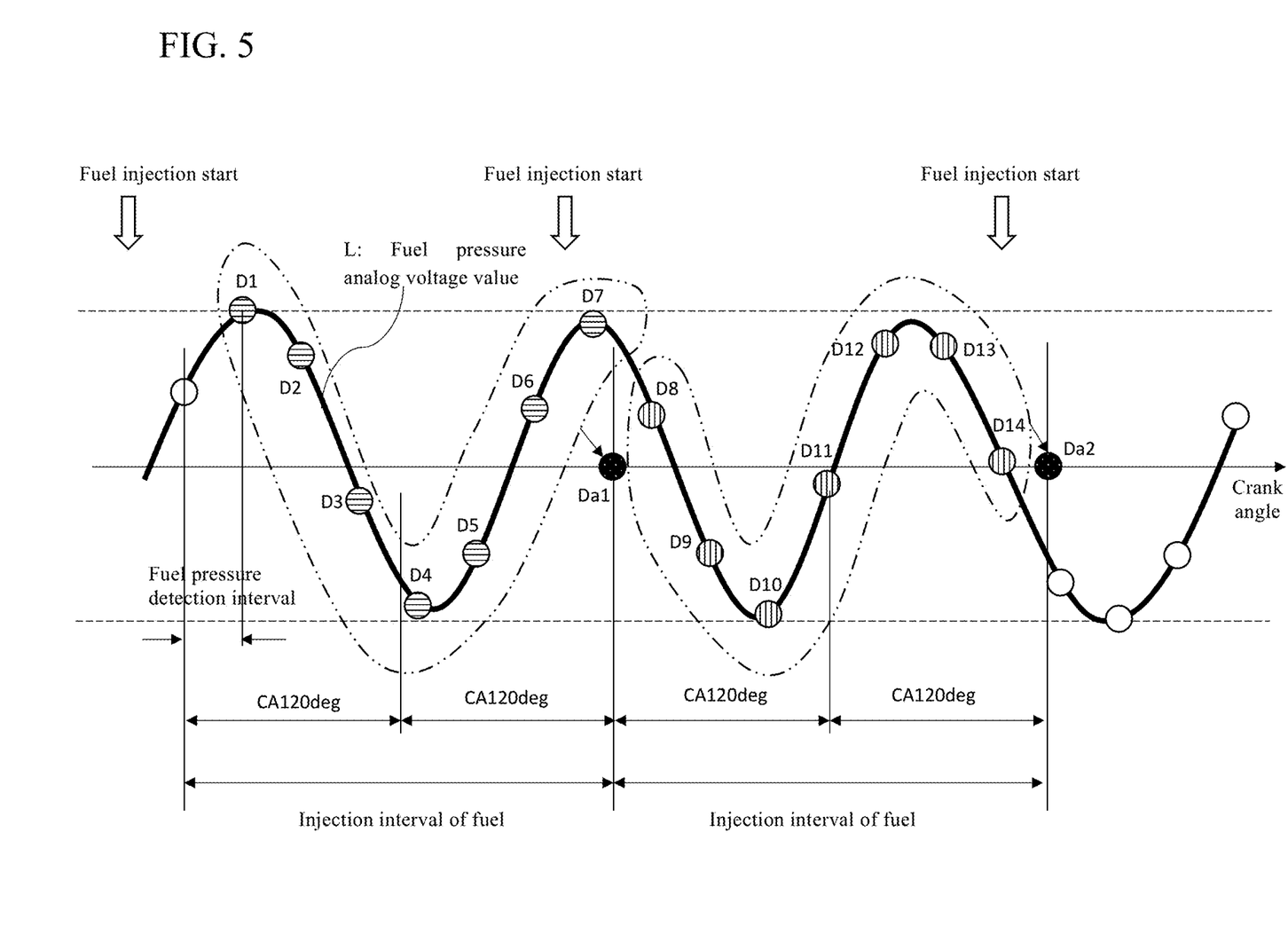
FIG. 5 is a diagram for describing a second smoothing process executed on the detected voltage value of the fuel pressure sensor in the internal combustion engine of FIG. 1.

FIG. 5 is a diagram for describing the second smoothing process executed on the detected voltage value of the fuel pressure sensor 45 in the internal combustion engine 1 of the present embodiment. The second smoothing is determined in consideration of a waveform L of the detected voltage value of the fuel pressure sensor 45 illustrated in FIG. 5 (the same as the waveform L illustrated in FIG. 4), and a process that can absorb or eliminate the periodic variations in the waveform L is adopted. As previously described, the pressure of the fuel discharged from the high-pressure pump 38 toward the fuel injection valves 19 is affected by the pressure feeding from the high-pressure pump 38 and/or the fuel injection from the fuel injection valves 19, and it is thus inferred that the detected voltage value of the pressure sensor 45 exhibits the waveform L illustrated in FIG. 5. Therefore, when the detected voltage value of the fuel pressure sensor 45 is strongly affected by the discharge from the high-pressure pump 38 and the variation cycle of the analog detection voltage value matches the discharge cycle of the high-pressure pump 38, it is desired to use, as the second smoothing, an average value calculation process of calculating the average value of a plurality of fuel pressures detected by the fuel pressure sensor 45 during one cycle time correlated with the discharge interval of the high-pressure pump 38.

Upon detection of the discharge interval of the high-pressure pump 38, when the high-pressure pump 38 is driven by the pump cam 49 fixed to the camshaft 48 of the internal combustion engine 1 as described above, the discharge cycle of the high-pressure pump 38 correlates with the rotation cycle of the camshaft 48 of the internal combustion engine 1. The rotation cycle of the camshaft 48 of the internal combustion engine 1 is the opening/closing cycle of the intake valve and the exhaust valve, and the discharge cycle of the high-pressure pump 38 can therefore be detected by using a crank angle signal detected by the crank angle sensor 32. Then, during one cycle time correlated with the discharge interval of the high-pressure pump 38 detected by the crank angle sensor 32, an averaging process is performed on a plurality of fuel pressure values sampled at time intervals, for example, of 2 msec. This represents the second detected fuel pressure smoothed by the second smoothing process. However, if the drive source of the high-pressure pump 38 has no relation to the drive of the internal combustion engine 1, the discharge cycle of the high-pressure pump 38 by the drive source may be detected regardless of the drive cycle of the internal combustion engine 1.

On the other hand, when the detected voltage value (waveform L) of the fuel pressure sensor 45 illustrated in FIG. 5 is strongly affected by the fuel injection and the variation cycle of the analog detection fuel pressure value matches the fuel injection cycle, it is desired to use, as the second smoothing, an average value calculation process of calculating the average value of a plurality of fuel pressures detected during one cycle time correlated with the injection interval of the fuel. The injection interval of fuel injection correlates with the combustion cycle of the internal combustion engine 1, and the injection interval of fuel injection can therefore be detected by using the crank angle signal detected by the crank angle sensor 32. Then, during one cycle time correlated with the fuel injection interval detected by the crank angle sensor 32, an averaging process is performed on a plurality of fuel pressure values sampled at time intervals, for example, of 2 msec. This represents the second detected fuel pressure smoothed by the second smoothing process.

FIG. 5 is a diagram for describing an average value calculation process of calculating the average value of a plurality of fuel pressures detected during one cycle time correlated with the discharge cycle of the high-pressure pump 38 and/or the injection cycle of the fuel injection valves 19. The average value calculation process is performed for the output waveform L of the detected voltage value of the fuel pressure sensor 45. In FIG. 5, when the sampling interval for the fuel pressure is, for example, 2 msec and the discharge cycle of the high-pressure pump 38 and/or the injection cycle of the fuel injection valves 19 is, for example, 240 CA (crank angle), among the data pieces of detected fuel pressures, data pieces D1 to D7 of the fuel pressures detected during one cycle time of 240 CA are subjected to the calculation process to obtain an average value Da1, and this is used for the subsequent fuel injection control. Likewise, data pieces D8 to D14 of the fuel pressures detected during next one cycle time of 240 CA are subjected to the calculation process to obtain an average value Da2, and this is used for the subsequent fuel injection control.

When the pressure of the fuel discharged from the high-pressure pump 38 toward the fuel injection valves 19 is affected by both the pressure feeding from the high-pressure pump 38 and the fuel injection from the fuel injection valves 19, or when it cannot be specified which affects the pressure of the fuel discharged from the high-pressure pump 38 toward the fuel injection valves 19, it is preferred to match the one cycle time correlated with the discharge interval of the high-pressure pump 38 to the one cycle time correlated with the fuel injection interval. For example, when the high-pressure pump 38 is a pump driven by the pump cam 49 fixed to the camshaft 48 of the internal combustion engine 1, the discharge cycle of the high-pressure pump 38 correlates with the combustion cycle of the internal combustion engine 1, and the cam shaft 48 rotates once at a crank angle CA of 720°; therefore, in a 3-cylinder engine, the discharge interval of the high-pressure pump 38 and the injection interval of the fuel can be matched at every 240 CA crank angle, and in a 4-cylinder engine, the discharge interval of the high-pressure pump 38 and the injection interval of the fuel can be matched at every 180 CA crank angle. Specifically, the cam shape of the pump cam 49 fixed to the camshaft 48 is formed in such a shape that the discharge interval of the high-pressure pump 38 is 240 CA for a 3-cylinder engine or 180 CA for a 4-cylinder engine.

When the high-pressure pump 38 is a pump driven by the pump cam 49 fixed to the camshaft 48 of the internal combustion engine 1, if it is attempted to match the discharge interval of the high-pressure pump 38 to the injection interval of the fuel in a 6-cylinder engine or an 8-cylinder engine in the same manner as above, they have to be matched at every 120 CA crank angle in a 6-cylinder engine or every 90 CA crank angle in a 8-cylinder engine. However, the pump cam 49 which realizes a short discharge interval such as 90 CA or 120 CA is not practical specifically because the cam shape becomes complicated. In a 6-cylinder engine or an 8-cylinder engine, therefore, the discharge interval of the high-pressure pump 38 and the injection interval of the fuel should not be matched, and in an 6-cylinder engine, a crank angle of 240 CA is set as one cycle time as in the case of a 3-cylinder engine, while in an 8-cylinder engine, a crank angle of 180 CA is set as one cycle time as in the case of a 4-cylinder engine. That is, in a 6-cylinder engine or an 8-cylinder engine, the setting is such that the fuel injection is performed twice for one discharge of the high-pressure pump 38, and it is therefore desired to use the average value calculation process of calculating the average value of a plurality of fuel pressures detected by the fuel pressure sensor 45 during one cycle time correlated with the discharge interval of the high-pressure pump 38.

In the camshaft 48 which rotates once at a crank angle of 720 CA, when the cam shape of the pump cam 49 fixed to the camshaft 48 is formed in such a shape that the discharge interval of the high-pressure pump 38 is 240 CA in a 3-cylinder engine and in a 6-cylinder engine or 180 CA in a 4-cylinder engine and in an 8-cylinder engine, the discharge interval of the high-pressure pump 38 and the injection interval of the fuel are matched in the 3-cylinder engine and the 4-cylinder engine, and therefore the second detected fuel pressure smoothed based on this cycle time is preferably used for both the calculation of the fuel injection pulse width for control of the fuel injection valves 19 and the fuel pump feedback control for the high-pressure pump 38.

When the detected voltage value of the fuel pressure sensor 45 is strongly affected by the fuel injection and the variation cycle of the analog detection fuel pressure value matches the fuel injection cycle, it is desired to use, as the second smoothing, the average value calculation process of calculating the average value of a plurality of fuel pressures detected during one cycle time correlated with the injection interval of the fuel. When the effect of fuel injection is strong, therefore, in a 6-cylinder engine, an injection interval of 120 CA is set as one cycle time for sampling the fuel pressure, while in an 8-cylinder engine, an injection interval of 90 CA is set as one cycle time for sampling the fuel pressure, and the second detected fuel pressure smoothed based on this cycle time is used for calculation of the fuel injection pulse width for control of the fuel injection valves 19. On the other hand, in the fuel pump feedback control of the high-pressure pump 38, the cycle time correlated with the discharge interval of the high-pressure pump 38, that is, 240 CA for a 6-cylinder engine or 180 CA for an 8-cylinder engine is set as one cycle time for sampling the fuel pressure, and the second detected fuel pressure smoothed based on this cycle time is used.

The engine control unit 11 of the present embodiment selects, based on the operating state of the internal combustion engine 1, whether to execute fuel injection control based on the first detected fuel pressure smoothed by the above-described first smoothing process or fuel injection control based on the second detected fuel pressure smoothed by the above-described second smoothing process. Here, the operating state of the internal combustion engine 1 is distinguished based on the degree of variation in the detected fuel pressure. The distinction based on the degree of variation in the fuel pressure may be made by whether the degree of variation in the fuel pressure is relatively large or small with respect to the previous degree of variation or may alternatively be made by whether the degree of variation in the fuel pressure is in a transient state or a steady state. More specifically, when the degree of variation in the detected fuel pressure is relatively large or in the transient state, it is preferred to execute the fuel injection control based on the first detected fuel pressure, while when the degree of variation in the detected fuel pressure is relatively small or in the steady state, it is preferred to execute the fuel injection control based on the second detected fuel pressure. Additionally or alternatively, the distinction may be made whether the internal combustion engine 1 is being started or has been started. For example, from the start of the internal combustion engine 1 until a predetermined time elapses after the engine rotation speed and the fuel pressure reach predetermined values or more, a determination may be made that the internal combustion engine 1 is being started, and thereafter a determination may be made that the internal combustion engine 1 has been started.

The degree of variation in the detected fuel pressure refers to the amount of variation in the detected fuel pressure per unit time (including an increase (+) and a decrease (−)), and it can be obtained by performing a comparison calculation on the fuel pressure values detected by the fuel pressure sensor 45. When the degree of variation is not within a predetermined determination value range (range of ±a (a is a positive constant)), it is said that "the degree of variation in the fuel pressure is in a transient state," while when the degree of variation is within the predetermined determination value range, it is said that "the degree of variation in the fuel pressure is in a steady state."

An example of a control procedure relating to the fuel injection control executed by the engine control unit 11 will then be described with reference to the flowchart of FIG. 6. The routine of steps S1 to S9 below is executed in the engine control unit 11 at predetermined time intervals.

First, in step S1, detection signals are input, including a detection signal from the vehicle speed sensor, a detection signal from the accelerator opening degree sensor, a detection signal from the crank angle sensor 32, a flag indicating the engine start, a detection signal from the fuel pressure sensor 45, and other detection signals from various sensors relating to the operating state of the internal combustion engine 1.

Step S1 is followed by step S2, in which the basic fuel injection pulse width Tp corresponding to the basic fuel injection amount is calculated in accordance with the operating load of the internal combustion engine 1 due to the driver's accelerator operation, such as the detection signal from the vehicle speed sensor or the detection signal from the accelerator opening degree sensor.

In step S3, the detection signal obtained by the fuel pressure sensor 45 is processed by the first smoothing, and this is adopted as the first detected fuel pressure. In parallel with this, in step S4, the detection signal obtained by the fuel pressure sensor 45 is processed by the second smoothing, and this is adopted as the second detected fuel pressure. Here, the first smoothing is a process in which the data sampling range is set as a unit time, whereas the second smoothing is a process in which the data sampling range is set as a variation cycle of the fuel pressure.

Steps S3 and S4 are followed by step S5, in which a determination is made whether the operating state of the internal combustion engine 1 is a first state (e.g., transient state, when starting the internal combustion engine 1) or a second state (e.g., steady state, after starting the internal combustion engine 1). This determination is executed based on the degree of variation in the fuel pressure detected by the fuel pressure sensor 45. For example, when the degree of variation in the fuel pressure is relatively large or in the transient state, the first state is determined, while when the degree of variation in the fuel pressure is relatively small or in the steady state, the second state is determined. When the first state is determined, the process proceeds to step S6.

In step S6, the fuel injection pulse width for control Ti is calculated using the first detected fuel pressure calculated in step S3. Specifically, the fuel pressure correction coefficient K1 corresponding to the first detected fuel pressure and another fuel correction coefficient K2 are calculated, the basic fuel injection pulse width Tp calculated in step S2 is multiplied by the fuel pressure correction coefficient K1 and the other fuel correction coefficient K2 to obtain a product, and the invalid injection pulse width Ts is added to the product to obtain the fuel injection pulse width for control Ti corresponding to the final fuel injection amount (Ti=Tp× K1×K2+Ts). The signal of the fuel injection pulse width for control Ti thus obtained is output to the fuel injection valves 19, and the target injection amount of fuel is thereby injected into each cylinder.

In step S7, the fuel pressure control valve 41 of the high-pressure pump 38 is feedback-controlled using the first detected fuel pressure calculated in step S3. According to this feedback control, the opening degree of the valve body 41a of the fuel pressure control valve 41 is adjusted in response to the first detected fuel pressure.

Referring again to step S5, when a determination is made that the operating state of the internal combustion engine 1 is the second state, the process proceeds to step S8. In step S8, the fuel injection pulse width for control Ti is calculated using the second detected fuel pressure calculated in step S4. Specifically, the fuel pressure correction coefficient K1 corresponding to the second detected fuel pressure and another fuel correction coefficient K2 are calculated, the basic fuel injection pulse width Tp calculated in step S2 is multiplied by the fuel pressure correction coefficient K1 and the other fuel correction coefficient K2 to obtain a product, and the invalid injection pulse width Ts is added to the product to obtain the fuel injection pulse width for control Ti corresponding to the final fuel injection amount (Ti=Tp× K1×K2+Ts). The signal of the fuel injection pulse width for control Ti thus obtained is output to the fuel injection valves 19, and the target injection amount of fuel is thereby injected into each cylinder.

In step S9, the fuel pressure control valve 41 of the high-pressure pump 38 is feedback-controlled using the second detected fuel pressure calculated in step S4. According to this feedback control, the opening degree of the valve body 41a of the fuel pressure control valve 41 is adjusted in response to the second detected fuel pressure.

Figure 6:
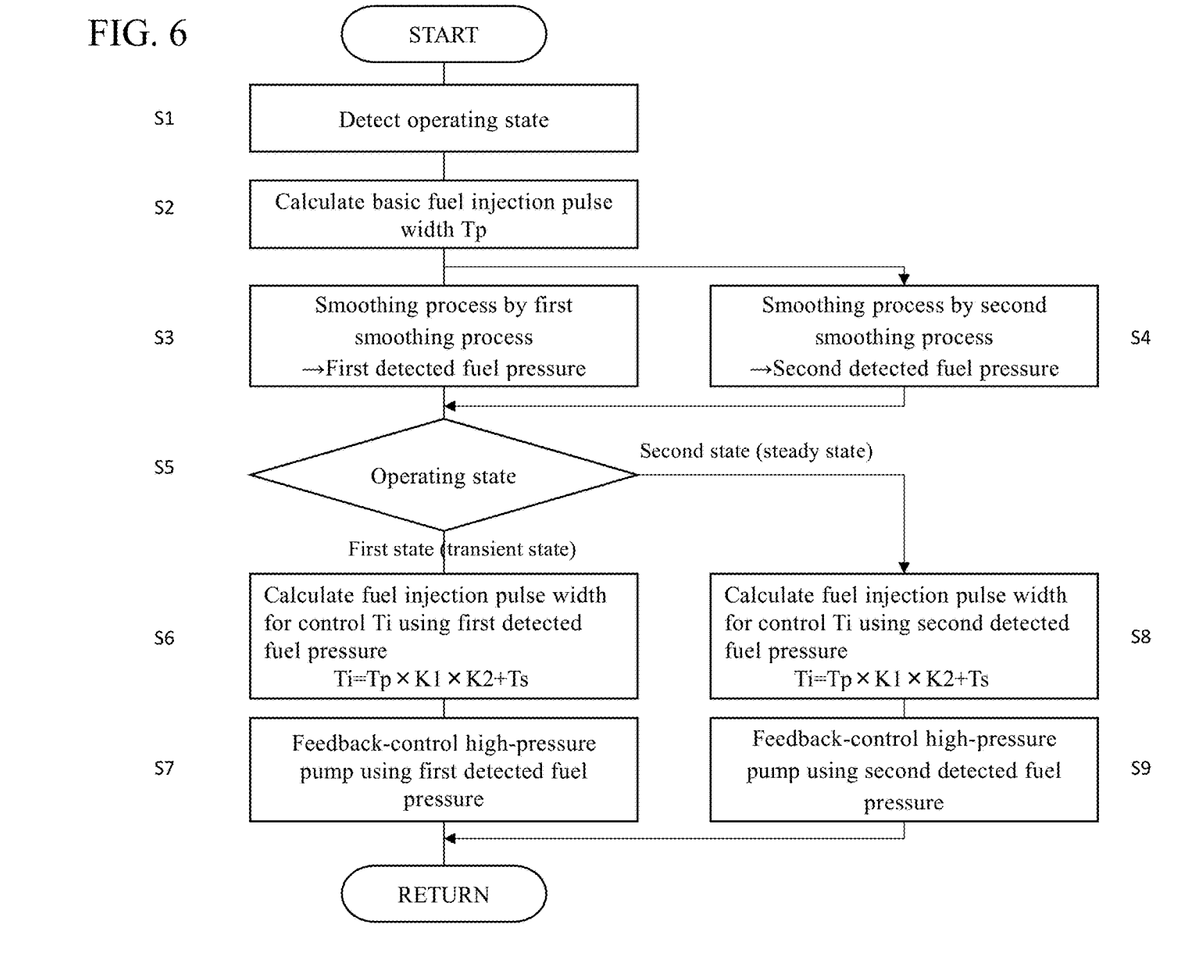
FIG. 6 is a flow chart illustrating an example of a control procedure executed in an engine control unit of FIGS. 1 and 2.

The first smoothing process in step S3 and the second smoothing process in step S4 illustrated in FIG. 6 are configured to be executed in parallel before determining the operating state of the internal combustion engine 1 in step S5, but the routine may be modified such that the order of step S5 and steps S3 and S4 is reversed, the operating state of the internal combustion engine 1 is determined in step S5, and any one of steps S3 and S4 is executed in accordance with the determination result.

As described above, according to the present embodiment, there are executed a first smoothing process of performing a smoothing process on a detected fuel pressure by first smoothing, a second smoothing process of performing a smoothing process on the detected fuel pressure by second smoothing different from the first smoothing, and a selection process of selecting, based on an operating state of the internal combustion engine, whether to execute fuel injection control based on a first detected fuel pressure smoothed by the first smoothing process or fuel injection control based on a second detected fuel pressure smoothed by the second smoothing process. This can further improve the accuracy in the air-fuel ratio control in accordance with the operating state of the internal combustion engine 1.

Moreover, according to the present embodiment, the selection process selects whether to execute the fuel injection control by the fuel injection pulse width for control corrected based on the first detected fuel pressure or the fuel injection control by the fuel injection pulse width corrected based on the second detected fuel pressure. This can further improve the accuracy in the air-fuel ratio control in accordance with the operating state of the internal combustion engine 1 from the viewpoint of the fuel injection amount.

Furthermore, according to the present embodiment, the selection process selects whether to execute the fuel pump feedback control based on the first detected fuel pressure or the fuel pump feedback control based on the second detected fuel pressure. This can further improve the accuracy in the air-fuel ratio control in accordance with the operating state of the internal combustion engine 1 from the viewpoint of the fuel pressure.

In addition, according to the present embodiment, the second smoothing process is an average value calculation process of calculating an average value of a plurality of fuel pressures detected during one cycle time correlated with a discharge interval of the high-pressure pump 38 or an average value calculation process of calculating an average value of a plurality of fuel pressures detected during one cycle time correlated with an injection interval of the fuel. By calculating the average value of a plurality of the detected fuel pressures for one cycle time correlated with any of the discharge interval of the high-pressure pump 38 and the injection interval of the fuel injection valves 19, which are main factors that affect the variation cycle of the detected fuel pressure, the detected fuel pressures can be smoothed to a fuel pressure value in which their variations are appropriately absorbed or eliminated.

Moreover, according to the present embodiment, the first smoothing process is a moderating process of performing calculation based on a function of $Pav(i)=Pav(i-1)\times\alpha+P\times(1-\alpha)$, where Pav represents a moderated value of the detected fuel pressure (i indicates this time and i−1 indicates last time), P represents the detected fuel pressure, and α represents a moderating coefficient ($0<\alpha<1$). This enables smoothing to a fuel pressure value in accordance with the sampling time interval.

Furthermore, according to the present embodiment, the operating state is distinguished based on a degree of variation in the detected fuel pressure, or the operating state is distinguished by whether it is in a transient state or a steady state. In addition, when the degree of variation in the detected fuel pressure is relatively large or in the transient state, the fuel injection control based on the first detected fuel pressure is executed, and when the degree of variation in the detected fuel pressure is relatively small or in the steady state, the fuel injection control based on the second detected fuel pressure is executed. Through this operation, when the degree of variation in the detected fuel pressure is relatively large or in the transient state, the large fuel pressure variation can be followed with good responsiveness, while when the degree of variation in the detected fuel pressure is relatively small or in the steady state, periodic variations in the detected fuel pressure can be eliminated appropriately.

The above high-pressure pump 38 corresponds to the fuel pump according to the present invention, the above fuel pressure sensor 45 corresponds to the fuel pressure detection device according to the present invention, and the above engine control unit 11 corresponds to the control device according to the present invention.

DESCRIPTION OF REFERENCE NUMERALS

1 Internal combustion engine
11 Engine control unit
12 Air-intake passage
13 Air filter
14 Air flow meter
15 Throttle valve
16 Collector
17 Throttle valve actuator
18 Throttle sensor
19 Fuel injection valve
20 Cylinder
21 Piston
22 Intake valve
23 Exhaust valve
24 Combustion chamber
25 Ignition plug
26 Exhaust passage
27 Air-fuel ratio sensor
28 Exhaust purification catalyst
29 Oxygen sensor
30 Muffler
31 Crankshaft
32 Crankshaft angle sensor
33 Cooling jacket
34 Water temperature sensor
35 Fuel tank
36 Low-pressure pump
37 Low-pressure fuel pipe
38 High-pressure pump (fuel pump)
39 Pressure regulator
40 Fuel return pipe
41 Fuel pressure control valve
41a Valve body
42 Check valve
43 High-pressure fuel pipe
44 Fuel rail
45 Fuel pressure sensor (fuel pressure detection device)
46 Fuel chamber
47 Plunger
48 Camshaft
49 Pump cam
50 Plunger cylinder
51 First opening portion
52 Second opening portion

The invention claimed is:

1. A fuel injection control device for an internal combustion engine comprising:
a fuel pump that pressure-feeds fuel;
a fuel injection valve that injects the fuel pressure-fed by the fuel pump directly into a cylinder of the internal combustion engine;
a fuel pressure detection device that detects a pressure of the fuel pressure-fed by the fuel pump; and
a control device; wherein:
the control device is configured to execute:
a first smoothing process of performing a smoothing process on a detected fuel pressure by first smoothing,
a second smoothing process of performing a smoothing process on the detected fuel pressure by second smoothing different from the first smoothing, and
a selection process of selecting, based on an operating state of the internal combustion engine, whether to execute fuel injection control based on a first detected fuel pressure smoothed by the first smoothing process or fuel injection control based on a second detected fuel pressure smoothed by the second smoothing process; and
the second smoothing process is:
an average value calculation process of calculating an average value of a plurality of fuel pressures detected during one cycle time correlated with a discharge interval of
the fuel pump, or an average value calculation process of calculating an average value of a plurality of fuel pressures detected during one cycle time correlated with an injection interval of the fuel.

2. The fuel injection control device for an internal combustion engine according to claim 1, wherein:
the fuel injection control comprises a correction calculation process of correcting, based on the detected fuel pressure subjected to the smoothing process, a basic fuel injection pulse width to calculate a fuel injection pulse width for control; and
the selection process comprises selecting whether to execute the fuel injection control by the fuel injection pulse width for control corrected based on the first detected fuel pressure or the fuel injection control by the fuel injection pulse width corrected based on the second detected fuel pressure.

3. The fuel injection control device for an internal combustion engine according to claim 1, wherein:
the fuel injection control comprises fuel pump feedback control of feedback- controlling the fuel pump based on the detected fuel pressure subjected to the smoothing process; and
the selection process comprises selecting whether to execute the fuel pump feedback control based on the first detected fuel pressure or the fuel pump feedback control based on the second detected fuel pressure.

4. The fuel injection control device for an internal combustion engine according to claim 1, wherein the first smoothing process is a moderating process of performing calculation based on a function of $Pav(i)=Pav(i-1)\times \alpha+P\times(1-\alpha)$, where Pav represents a moderated value of the detected fuel pressure (i indicates this time and i−1 indicates last time), P represents the detected fuel pressure, and a represents a moderating coefficient ($0<a<1$).

5. The fuel injection control device for an internal combustion engine according to claim 1, wherein the operating state is distinguished based on a degree of variation in the detected fuel pressure.

6. The fuel injection control device for an internal combustion engine according to claim 5, wherein the operating state is distinguished by whether it is in a transient state or a steady state.

7. The fuel injection control device for an internal combustion engine according to claim 6, wherein, when the degree of variation in the detected fuel pressure is relatively large or in the transient state, the fuel injection control based on the first detected fuel pressure is executed, and when the degree of variation in the detected fuel pressure is relatively small or in the steady state, the fuel injection control based on the second detected fuel pressure is executed.

\* \* \* \* \*